Figure 1:
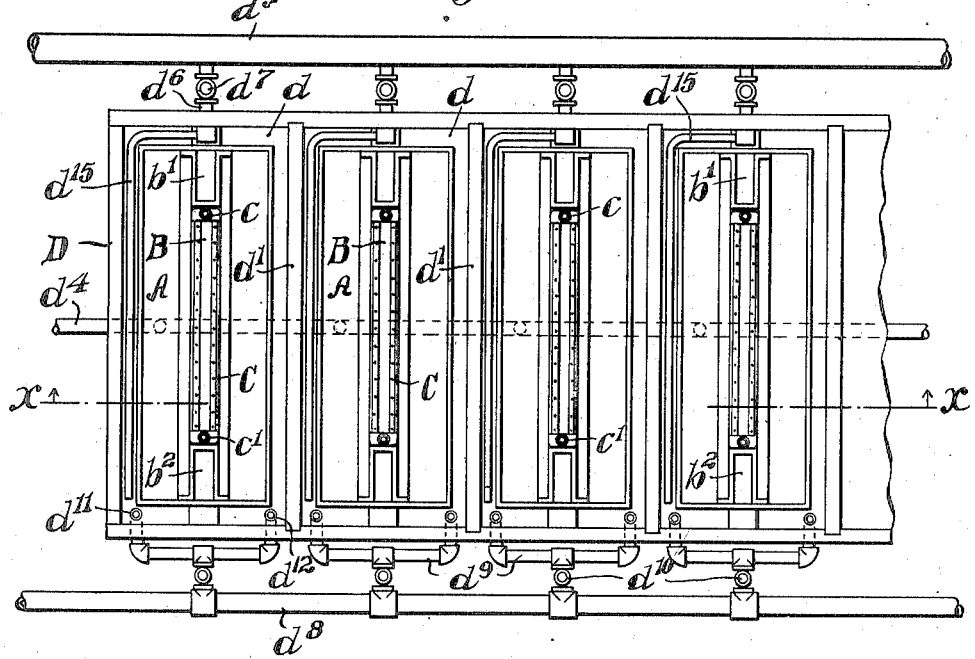

J. J. DE KINDER.
MEANS FOR MAKING ARTIFICIAL PLATE ICE.
APPLICATION FILED JULY 24, 1909.

947,615.

Patented Jan. 25, 1910.

Witnesses:
Daniel Webster, Jr.
Thomas M. Smith

Inventor,
Joseph J. de Kinder,
By J. Walter Douglas
Attorney.

UNITED STATES PATENT OFFICE.

JOSEPH JAMES DE KINDER, OF PHILADELPHIA, PENNSYLVANIA.

MEANS FOR MAKING ARTIFICIAL PLATE-ICE.

947,615.  Specification of Letters Patent.  Patented Jan. 25, 1910.

Application filed July 24, 1909. Serial No. 509,346.

*To all whom it may concern:*

Be it known that I, JOSEPH J. DE KINDER, a citizen of the United States, residing at the city of Philadelphia, in the county of Philadelphia and State of Pennsylvania, have invented certain new and useful Improvements in Means for Making Artificial Plate-Ice, of which the following is a specification.

My invention relates to means to make at one and the same time a plurality of plates of artificial ice in a pure crystal-like state, free from air bubbles or needles in each of a series of cans arranged in nested relationship, within a refrigerating tank.

The principal objects of my invention are first, to provide practical means to produce a plurality of plates of artificial ice at one and the same time in each of a series of cans under the influence of a refrigerant, for instance, a brine solution such as ordinarily employed in artificial ice production; second, to provide means for producing a plurality of plates of ice in each of a series of cans with a device for agitating as well as sterilizing the body of water undergoing freezing into a plurality of plates of artificial ice and without ice films or ice bridges being formed between the built up ice into a plurality of plates of ice of each of the cans; third, to provide economical and thoroughly practical means to permit of producing in each of a series of cans at one and the same time from a body of water, a plurality of independent or distinct plates of artificial ice and in which during their formation they are insulated and isolated from one another by a hollow barrier and at the same time during their formations supplying ozone or air to the body of water of each can and while being congealed or frozen into plates of artificial ice and with the formation of ice films or ice bridges prevented, during the formations into separately built up plates of such artificial ice; fourth, to provide economical and practical means to permit of the quick thawing of the formed plates of ice in each can, without affecting other formations into plates of ice going on in other cans of the nested series of cans mounted in a refrigerating tank; fifth, to provide economical and practical means to permit of a plurality of plates of artificial ice being built up in each can at one and the same time and the therebetween water of the body of water while being congealed or frozen into such plates of artificial ice thoroughly insulated and isolated and required agitations of the body of water permitted between the forming plates while the freezing is going regularly on to thus assist in the preventing of ice films or bridges being built up between or about the forming plates of artificial ice; sixth, to provide means to quickly and effectively thaw formed plates of artificial ice in each can, without disturbing other bodies of water being frozen into plates of artificial ice in other cans, when the cans are arranged in nested relationship within a refrigerating tank; and seventh, to provide a water-containing - refrigerating - can internally arranged with a hollow barrier to isolate and to insulate the sub-divided body of water of each can so that by freezing to provide two separate or distinct plates of artificial ice in each can, the said barrier also aiding in the thawing of the formed plates of artificial ice, as well as affording withdrawal of uncongealed water from each can either before, during or after the thawing off of the plurality of plates of artificial ice of the series of cans.

My invention stated in general terms, consists of means for making a plurality of plates of artificial ice at one and the same time in each of a series of cans arranged in nested relationship within a refrigerating tank.

Figure 2:
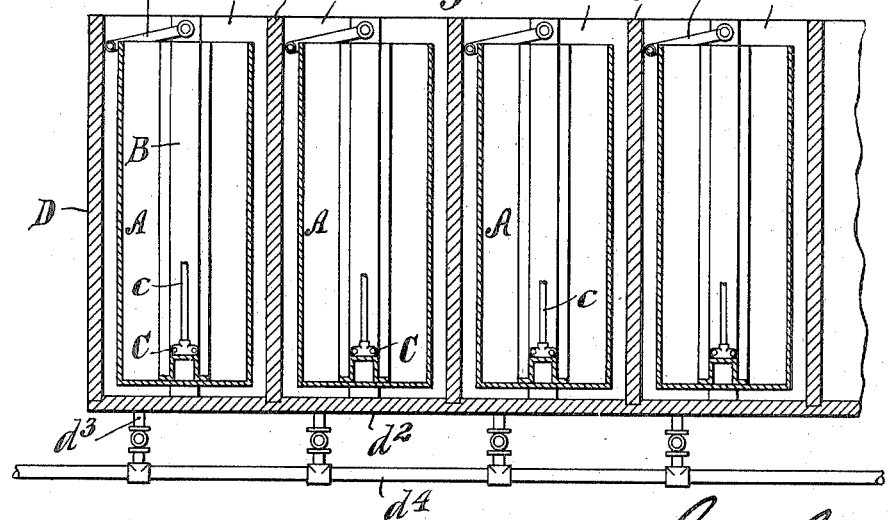

Figure 1, is a top or plan view of a refrigerating tank provided with a series of separated cans for forming in each a plurality of plates of artificial ice, also showing the wooden or other insulating partitions forming the tank into a series of sections, the hollow barrier of each can for insulating and isolating a body of fluid of each can while being congealed or frozen into separate plates of ice, the controlled freezing medium to be supplied about each can of the series of the tank and arranged so as to be shifted from one side of a can to the other, to maintain thereby the fluid body being frozen, uniform, the means for discharging the freezing medium from the tank and piping beneath the tank with suitable connections to the tank about the cans for thawing or loosening the ice cakes of each of the series of cans; and Fig. 2, is a vertical sectional view on the line $x$, $x$, of Fig. 1, showing the general internal detail arrangement of the series of nested cans within insulated separated sections of a refrigerating tank.

Referring to the drawings A, is an oblong metal or other type of can. This can is provided interiorly thereof, with a barrier B, which as shown is in form hollow and of a U-shape, in structure to insulate and isolate a body of water placed in a can to be congealed or frozen into artificial plate ice, when a freezing medium, such as a brine solution, is brought exteriorly in contact with the bottom and walls of the can, for example, either by immersion of the fluid containing can A, in a refrigerant tank or in any other preferred manner suitable for artificial ice making. The hollow barrier B, in use, serves to sufficiently insulate and isolate the volume of water within the can, during the ice formations from the bottom and walls of each can toward the barrier and so as to economically and practically sub-divide each can in order to permit in the congealing of such body of water two separate or distinct plates of artificial ice at one and the same time being produced. Moreover, the barrier B, provides a means in which a heating medium may be conducted therethrough to assist in the thawing or loosening of the built up plates of ice and thus removal of the plurality of plates of ice formed in each can. This barrier B, as arranged in Figs. 1 and 2, serves as a support for a perforated device C, for admitting an agitating fluid, as ozone or air from a supply, not shown, through a vertical pipe $c$ or $c^1$, connected with the device, so as to pass from the perforated device C, in a bubbling or streaming form either continually or intermittently into the body of water of the can and while the freezing of the said body of water is going on to form a plurality of plates of ice therein, in a sterilized state in the one instance or purified plates of ice, in the other. The admitting of the agitating fluid as ozone or air into the body of water aids in preventing ice films or ice bridges being formed between and about the barrier B, sub-dividing the body of water of each can.

D is a refrigerating tank divided into a series of independent sections $d$, separated by insulating partitions $d^1$. In each section $d$, is mounted a can A, provided with an internal hollow barrier B. Underneath the bottom $d^2$, of the tank D, by means of nipples $d^3$, connected with the respective sections $d$, of the tank, is provided a piping $d^4$, for passing into each section a heating medium for loosening the ice cakes formed. $d^5$, is the brine supply pipe, which by branch pipes $d^6$, connected with the series of sections $d$, of the tank D, supply a solution around the cans A, by means of piping $d^{15}$, arranged to be swung either to one side or to the other of the cans A, of the series of sections $d$, of the tank D. Each branch pipe $d^6$, is provided with a stop-cock $d^7$, for shutting off the brine supply.

$d^8$, is a brine discharge pipe from each of the sections $d$, of the tank D, to a receiving vat, not shown, by T-connections $d^9$, provided with stop-cocks $d^{10}$, whereby the discharge of brine is under perfect control. The terminals of the connections $d^9$, within the sections $d$, of the tank D, may be arranged so as to receive detachable stand-pipes $d^{11}$ and $d^{12}$, to facilitate removal of the refrigerant from the sections $d$, through either the pipe $d^{11}$, or the pipe $d^{12}$, into the discharge $d^8$. The pipe $d^{11}$, or the pipe $d^{12}$, not in service, may be plugged up, if the arrangement as shown is used as a means to free a section $d$, of the tank D, of its brine solution, after a plurality of plates of artificial ice have been formed. Thawing of the plates from the bottom and walls of the cans A, and away from the hollow barriers B, when the sections are deprived of their brine solution, is permitted by passing a heating medium from a supply through the piping $d^4$, and nipples $d^3$, into the bottom of each of the sections $d$, of the tank D, and to a height sufficient to accomplish the desired thawing of the plates of ice formed from the bottom and walls of the cans, within the tank D. At the same time, a hose may be directed through one of the legs or members $b^1$, $b^2$, of the hollow barrier B, if desired, to facilitate the thawing operation.

It will be understood that loosening of the ice cakes of one can may be quickly accomplished and while other fluid-contained cans of the series of the tank D, are each making a plurality of cakes of ice. With the sections $d$, of the tank D, arranged so that the brine supply can be quickly reversed to admit the brine either to one side of the can or to the other of each section, if one portion is colder than the other, this is quickly corrected thereby, so as to insure uniformity in the formation of the plurality of cakes of ice in a given time in each of the cans.

Having thus described the nature and objects of my invention, what I claim as new and desire to secure by Letters Patent is:—

In an ice making machine, a refrigerating tank divided into a series of independent sections to support cans, means to permit of a plurality of plates or cakes of artificial ice being made at one and the same time in said cans, piping connected with said tank to conduct the heating medium into the sections of the said tank for loosening the ice cakes or plates of said cans and a brine supply having branches leading to said tank for conducting the brine around said cans and having extensions arranged to be swung from one side to the other of the cans of said tank, substantially as and for the purposes described.

In witness whereof, I have hereunto set my signature in the presence of two subscribing witnesses.

JOSEPH JAMES DE KINDER.

Witnesses:
J. WALTER DOUGLASS,
THOS. M. SMITH.